US012641579B2

(12) United States Patent
Li et al.

(10) Patent No.: US 12,641,579 B2
(45) Date of Patent: May 26, 2026

(54) METHOD AND APPARATUS FOR ADJUSTING INNER LOOP VALUE, STORAGE MEDIUM AND ELECTRONIC DEVICE

(71) Applicant: ZTE Corporation, Shenzhen (CN)

(72) Inventors: Jianguo Li, Shenzhen (CN); Qiaoyan Liu, Shenzhen (CN); Kai Mao, Shenzhen (CN); Wangwang Ji, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 334 days.

(21) Appl. No.: 18/036,925

(22) PCT Filed: Dec. 9, 2021

(86) PCT No.: PCT/CN2021/136759
§ 371 (c)(1),
(2) Date: May 15, 2023

(87) PCT Pub. No.: WO2022/121979
PCT Pub. Date: Jun. 16, 2022

(65) Prior Publication Data
US 2023/0422220 A1    Dec. 28, 2023

(30) Foreign Application Priority Data

Dec. 9, 2020    (CN) .......................... 202011433224.3

(51) Int. Cl.
*H04W 72/0446*    (2023.01)
*H04L 1/1607*    (2023.01)
*H04W 72/12*    (2023.01)

(52) U.S. Cl.
CPC ....... *H04W 72/0446* (2013.01); *H04L 1/1628* (2013.01); *H04W 72/12* (2013.01)

(58) Field of Classification Search
CPC .............. H04W 72/0446; H04W 72/12; H04L 1/1628; H04L 1/0015; H04L 1/1867;
(Continued)

(56) References Cited

U.S. PATENT DOCUMENTS

2005/0143114 A1* 6/2005 Moulsley .............. H04L 1/1692
455/69
2006/0126755 A1* 6/2006 Itou ........................ H04W 52/12
375/141
(Continued)

FOREIGN PATENT DOCUMENTS

| CN | 103546244 A | 1/2014 |
| CN | 106656411 A | 5/2017 |
| CN | 111355557 A | 6/2020 |
| CN | 111447041 A | 7/2020 |

OTHER PUBLICATIONS

European Search Report for corresponding application EP21902684; Mail date May 10, 2024.
(Continued)

*Primary Examiner* — Mang Hang Yeung
(74) *Attorney, Agent, or Firm* — CANTOR COLBURN LLP

(57) ABSTRACT
Provided are a method and an apparatus for adjusting an inner loop value, The method includes: repeatedly executing the following steps, wherein a history inner loop adjustment factor of each time-domain scheduling unit in a radio frame is initialized to be an initial inner loop adjustment factor of each time-domain scheduling unit: determining a block error rate corresponding to each time-domain scheduling unit according to ACK/NACK information corresponding to each time-domain scheduling unit, wherein the radio frame comprises N time-domain scheduling units, N being a positive integer; determining a current inner loop adjustment factor of each time-domain scheduling unit according to the block error rate corresponding to each time-domain sched-
(Continued)

Determine a block error rate corresponding to each time-domain scheduling unit according to ACK/NACK information corresponding to each time-domain scheduling unit, wherein the radio frame comprises N time-domain scheduling units, N being a positive integer    S202

Determine a current inner loop adjustment factor of each time-domain scheduling unit according to the block error rate corresponding to each time-domain scheduling unit and the history inner loop adjustment factor of each time-domain scheduling unit    S204

Adjust an inner loop value corresponding to each time-domain scheduling unit according to the current inner loop adjustment factor of each time-domain scheduling unit    S206 uling unit and the history inner loop adjustment factor of each time-domain scheduling unit; and adjusting an inner loop value corresponding to each time-domain scheduling unit according to the current inner loop adjustment factor of each time-domain scheduling unit.

19 Claims, 6 Drawing Sheets

(58) Field of Classification Search
CPC ..... H04L 1/201; H04L 5/0058; H04L 5/0055; G06F 18/24765; G06F 18/214; G06F 18/24
USPC .......................................................... 370/329
See application file for complete search history.

(56) References Cited

U.S. PATENT DOCUMENTS

| | | | |
|---|---|---|---|
| 2009/0082056 A1* | 3/2009 | Iwanaga | H04W 52/44 |
| | | | 455/522 |
| 2009/0201870 A1* | 8/2009 | Goto | H04W 52/48 |
| | | | 370/329 |
| 2013/0310091 A1 | 11/2013 | Tabet et al. | |
| 2014/0126467 A1 | 5/2014 | Lu et al. | |
| 2014/0307645 A1* | 10/2014 | Ji | H04L 5/0053 |
| | | | 370/329 |
| 2015/0049703 A1 | 2/2015 | Nobukiyo et al. | |

OTHER PUBLICATIONS

International Search Report for corresponding application PCT/CN2021/136759 filed Dec. 9, 2021; Mail date Jan. 30, 2022.

* cited by examiner

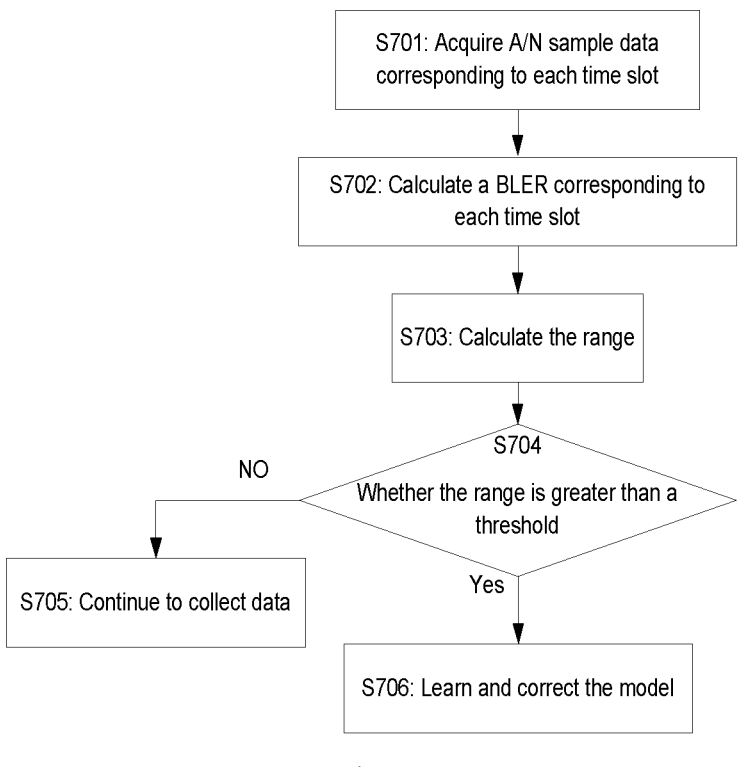

S701: Acquire A/N sample data corresponding to each time slot

S702: Calculate a BLER corresponding to each time slot

S703: Calculate the range

S704
Whether the range is greater than a threshold

NO

S705: Continue to collect data

Yes

S706: Learn and correct the model

Fig.7

S801: Acquire a BLER corresponding to each time slot

S802: Classify time slots

S803: Calculate an average BLER of each category

S804: Calculate a correction value of each category

S805: Correct a model

Fig.8

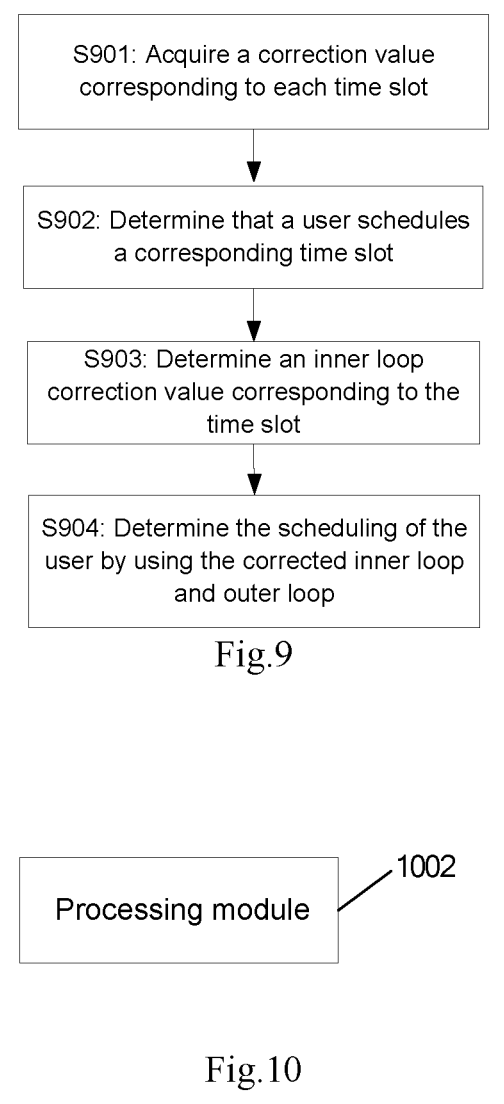

S901: Acquire a correction value corresponding to each time slot

S902: Determine that a user schedules a corresponding time slot

S903: Determine an inner loop correction value corresponding to the time slot

S904: Determine the scheduling of the user by using the corrected inner loop and outer loop

Fig.9

Processing module — 1002

Fig.10

METHOD AND APPARATUS FOR ADJUSTING INNER LOOP VALUE, STORAGE MEDIUM AND ELECTRONIC DEVICE

CROSS-REFERENCE TO RELATED APPLICATION

The present disclosure is based on Chinese patent application CN 202011433224.3 filed on Dec. 9, 2020 and entitled "Method and Apparatus for Adjusting Inner Loop Value, Storage Media and Electronic Device", and claims priority to this patent application, the disclosure of which is incorporated herein by reference in its entirety.

TECHNICAL FIELD

The embodiments of the present disclosure relate to the field of communications, and in particular, to a method and an apparatus for adjusting an inner loop value, a storage medium and an electronic device.

BACKGROUND

With the development of the mobile communication technology, the demands of users for communications are also gradually increasing, the communication demand develops from voice as a dominant factor to data as a dominant factor currently, and the communication demand is continuously increasing, such as the demand of real-time watching of high-definition live streaming at a higher service rate. In order to meet these demands, the fifth generation (5G) mobile communication technology emerges.

In a 5G standard protocol, reference signals configured for different time slots are different, which results in a difference in quantities of valid information transmitted by the same number of Resource Blocks (RB), and therefore code rates of users in different time slots are different, thereby causing a difference in demodulation performance. Furthermore, the influence of uplink-downlink switching on a radio frequency end also causes a difference in demodulation performance between time slots, and current network tests may also prove that the difference exists.

A conventional Adaptive Modulation and Coding (AMC) technology is based on a user level, and can only compensate for a user-level difference, but a difference between time slots cannot be quickly compensated by user-level AMC. Therefore, when the user's demodulation performance greatly differs between time slots, a Block Error Rate (BLER) converges from the user's perspective, but a large difference in the BLER of different time slots will occur. That is, some time slots have very high BLERs and some time slots have very low BLERs, thus the spectral efficiency is not improved sufficiently. This technical problem can be solved by user inter-time slot AMC. However, as inter-time slot AMC introduces a time slot dimension, the number of samples for AMC learning of each time slot is reduced, thereby further exacerbating the problem of non-convergence of users in small packet scheduling.

SUMMARY

The embodiments of the present disclosure provide a method and an apparatus for adjusting an inner loop value, a storage medium and an electronic device, so as to solve at least the technical problem that a demodulation difference between time-domain scheduling units cannot be quickly compensated by user-level AMC.

According to an embodiment of the present disclosure, provided is a method for adjusting an inner loop value, comprising: repeatedly executing the following steps, wherein a history inner loop adjustment factor of each time-domain scheduling unit in a radio frame is initialized to be an initial inner loop adjustment factor of each time-domain scheduling unit: determining a block error rate corresponding to each time-domain scheduling unit according to ACK/NACK information corresponding to each time-domain scheduling unit, wherein the radio frame comprises N time-domain scheduling units, N being a positive integer; determining a current inner loop adjustment factor of each time-domain scheduling unit according to the block error rate corresponding to each time-domain scheduling unit and the history inner loop adjustment factor of each time-domain scheduling unit; and adjusting an inner loop value corresponding to each time-domain scheduling unit according to the current inner loop adjustment factor of each time-domain scheduling unit.

According to another embodiment of the present disclosure, provided is an apparatus for adjusting an inner loop value, comprising: a processing module, wherein the processing module is configured to repeatedly execute the following steps, wherein a history inner loop adjustment factor of each time-domain scheduling unit in a radio frame is initialized to be an initial inner loop adjustment factor of each time-domain scheduling unit: determining a block error rate corresponding to each time-domain scheduling unit according to ACK/NACK information corresponding to each time-domain scheduling unit, wherein the radio frame comprises N time-domain scheduling units, N being a positive integer; determining a current inner loop adjustment factor of each time-domain scheduling unit according to the block error rate corresponding to each time-domain scheduling unit and the history inner loop adjustment factor of each time-domain scheduling unit; and adjusting an inner loop value corresponding to each time-domain scheduling unit according to the current inner loop adjustment factor of each time-domain scheduling unit.

According to still another embodiment of the present disclosure, further provided is a computer-readable storage medium, the computer-readable storage medium storing a computer program, wherein the computer program is configured to execute the steps in any one of the described method embodiments when running.

According to still another embodiment of the present disclosure, further provided is an electronic device, comprising a memory and a processor, wherein the memory stores a computer program, and the processor is configured to run the computer program so as to execute the steps in any one of the described method embodiments.

BRIEF DESCRIPTION OF THE DRAWINGS

FIG. 7 is a flowchart of a feature extraction and calculation phase of a method for adjusting an inner loop value according to another embodiment of the present disclosure.

FIG. 8 is a flowchart of a model learning phase of a method for adjusting an inner loop value according to another embodiment of the present disclosure.

FIG. 9 is a flowchart of a model application phase of a method for adjusting an inner loop value according to another embodiment of the present disclosure.

FIG. 10 is a structural block diagram of an apparatus for adjusting an inner loop value according to an embodiment of the present disclosure.

DETAILED DESCRIPTION OF THE EMBODIMENTS

The embodiments of the present disclosure will be described below in detail with reference to the drawings and in conjunction with the embodiments.

It should be noted that, terms such as "first" and "second" in the description and the claims of the present disclosure and the described drawings are used to distinguish similar objects, but are not necessarily used to describe a specific sequence or order.

Figure 1:
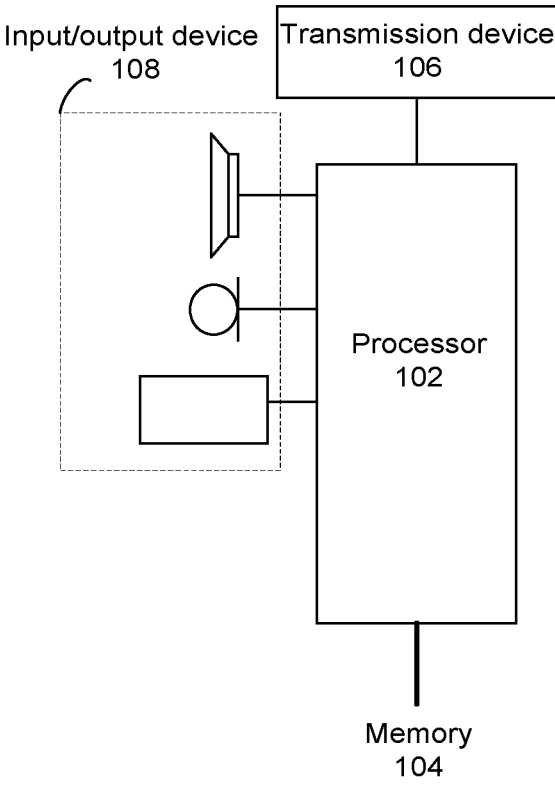
FIG. 1 is a structural block diagram of hardware of an optional electronic device according to an embodiment of the present disclosure.

The method embodiments provided in the embodiments of the present disclosure may be executed in a mobile terminal, a base station, a computer terminal, a server, or a similar computing apparatus. By taking running on an electronic device as an example, FIG. 1 is a structural block diagram of hardware of an optional electronic device according to an embodiment of the present disclosure. As shown in FIG. 1, the electronic device may comprise one or more (only one is shown in FIG. 1) processor 102 (the processor 102 may include, but are not limited to, a processing apparatus such as a microprocessor MCU or a programmable logic device FPGA) and a memory 104 for storing data, wherein the electronic device may further comprise a transmission device 106 for a communication function, and an input/output device 108. A person of ordinary skill in the art may understand that the structure shown in FIG. 1 is merely illustrative, which does not limit the structure of the described electronic device. For example, the electronic device may further comprise components more or less than that shown in FIG. 1, or have a configuration different from that shown in FIG. 1.

The memory 104 may be configured to store a computer program, for example, a software program and a module of application software, such as a computer program corresponding to the method for adjusting an inner loop value in the embodiment of the present disclosure. The processor 102 runs the computer program stored in the memory 104, so as to execute various function applications and data processing, i.e. to implement the described method. The memory 104 may comprise a high-speed random access memory, and may also comprise a non-volatile memory, such as one or more magnetic storage apparatuses, flash memory, or other non-volatile solid-state memory. In some examples, the memory 104 may further comprise a memory configured remotely relative to the processor 102, and the remote memory may be connected to the electronic device over a network. Examples of the described network include, but are not limited to, the Internet, intranets, local area networks, mobile communication networks, and combinations thereof.

The transmission device 106 is configured to receive or transmit data via a network. Specific examples of the described network may include a wireless network or a wired network. In an example, the transmission device 106 may comprise a Network Interface Controller (NIC) that may be connected to other network devices to communicate with the Internet. In an example, the transmission device 106 may be a Radio Frequency (RF) module configured to communicate wirelessly with the Internet.

Figure 2:
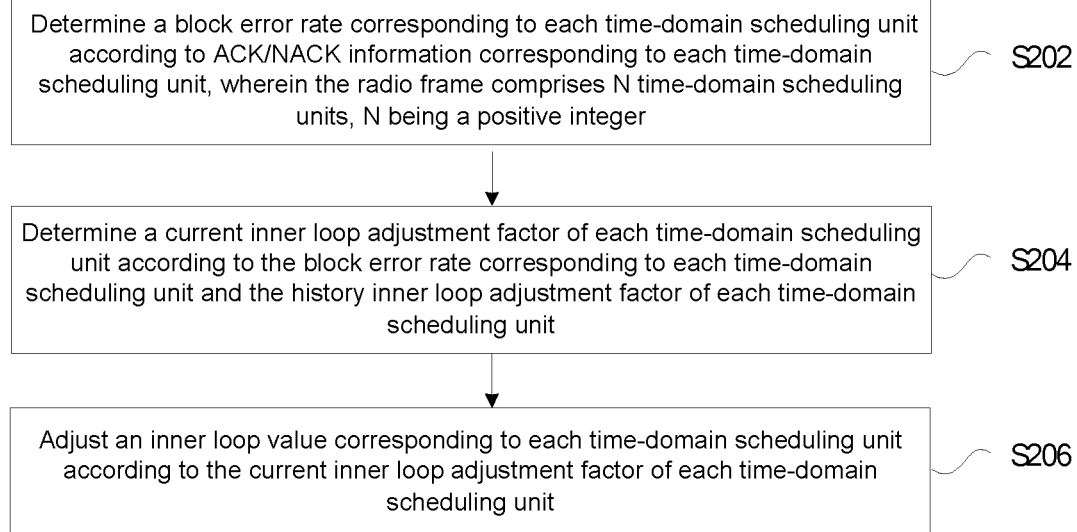
FIG. 2 is a flowchart of a method for adjusting an inner loop value according to an embodiment of the present disclosure.

Provided in the present embodiment is a method for adjusting an inner loop value. FIG. 2 is a flowchart of a method for adjusting an inner loop value according to an embodiment of the present disclosure. As shown in FIG. 2, the flow comprises the following steps: repeatedly executing the following steps S202 to S206, wherein a history inner loop adjustment factor of each time-domain scheduling unit in a radio frame is initialized to be an initial inner loop adjustment factor of each time-domain scheduling unit:

step S202: determining a block error rate corresponding to each time-domain scheduling unit according to ACK/NACK information corresponding to each time-domain scheduling unit, wherein the radio frame comprises N time-domain scheduling units, N being a positive integer;

step S204: determining a current inner loop adjustment factor of each time-domain scheduling unit according to the block error rate corresponding to each time-domain scheduling unit and the history inner loop adjustment factor of each time-domain scheduling unit; and step S206: adjusting an inner loop value corresponding to each time-domain scheduling unit according to the current inner loop adjustment factor of each time-domain scheduling unit.

According to the present disclosure, the following steps are repeatedly executed, wherein a history inner loop adjustment factor of each time-domain scheduling unit in a radio frame is initialized to be an initial inner loop adjustment factor of each time-domain scheduling unit: determining a block error rate corresponding to each time-domain scheduling unit according to ACK/NACK information corresponding to each time-domain scheduling unit, wherein the radio frame comprises N time-domain scheduling units, N being a positive integer; determining a current inner loop adjustment factor of each time-domain scheduling unit according to the block error rate corresponding to each time-domain scheduling unit and the history inner loop adjustment factor of each time-domain scheduling unit; and adjusting an inner loop value corresponding to each time-domain scheduling unit according to the current inner loop adjustment factor of each time-domain scheduling unit. As a current inner loop adjustment factor of each time-domain scheduling unit is determined according to the block error rate corresponding to each time-domain scheduling unit and the history inner loop adjustment factor of each time-domain scheduling unit, and an inner loop value corresponding to each time-domain scheduling unit is further adjusted according to the current inner loop adjustment factor of each time-domain scheduling unit, the technical problem that a demodulation difference between time-domain scheduling units cannot be quickly compensated by user-level AMC can be solved, and the technical effects of quickly compensating for a demodulation difference between time slots and performing differential scheduling for users in different time-domain scheduling units according to a difference in demodulation performance are achieved.

It should be noted that, in the described embodiment, determining a block error rate corresponding to each time-domain scheduling unit according to ACK/NACK information corresponding to each time-domain scheduling unit comprises: collecting ACK/NACK information corresponding to each time-domain scheduling unit, and determining a block error rate corresponding to each time-domain scheduling unit according to the ACK/NACK information corresponding to each time-domain scheduling unit.

In the described embodiment, the block error rate corresponding to each time-domain scheduling unit can be determined, ACK/NACK information except conservative scheduling on each time-domain scheduling unit is collected, and the ACK/NACK is counted separately for each time-domain scheduling unit. Optionally, the block error rate $BLER_i$ corresponding to each time-domain scheduling unit is determined according to the following formula:

$$BLER_i = \frac{ni1}{ni1 + ni2},$$

wherein i=1, 2, . . . N, ni1 is the number of NACKs corresponding to a time-domain scheduling unit i, and ni2 is the number of ACKs corresponding to the time-domain scheduling unit i.

In an exemplary embodiment, determining a current inner loop adjustment factor of each time-domain scheduling unit according to the block error rate corresponding to each time-domain scheduling unit and the history inner loop adjustment factor of each time-domain scheduling unit comprises: in the case where the range of the block error rates corresponding to the N time-domain scheduling units is greater than or equal to a preset threshold, determining a current inner loop adjustment factor $T\_factor_i$ of a time-domain scheduling unit i according to the following formula: $T\_factor_i=(1-\alpha)*T'\_factor_i+\alpha*factor_i$, wherein $1 \leq i \leq N$, $\alpha$ is a filter factor, $0 \leq \alpha \leq 1$, $T'\_factor_i$ is a history inner loop adjustment factor of the time-domain scheduling unit i, $factor_i=(BLER\_tar-BLER_i)*step$, BLER_tar is a preset target value of the block error rate, $BLER_i$ is a block error rate corresponding to the time-domain scheduling unit i, and step is an adjustment step length, and step is greater than 0.

In an exemplary embodiment, determining a current inner loop adjustment factor of each time-domain scheduling unit according to the block error rate corresponding to each time-domain scheduling unit and the history inner loop adjustment factor of each time-domain scheduling unit comprises: in the case where the range of the block error rates corresponding to the N time-domain scheduling units is greater than or equal to a preset threshold, according to the block error rate corresponding to each time-domain scheduling unit, dividing the N time-domain scheduling units into M subsets, wherein the range of the block error rates corresponding to the time-domain scheduling units of each of the M subsets is less than the preset threshold, M being a positive integer, and M being less than N; determining an inner loop adjustment factor corresponding to each subset according to the block error rates corresponding to the time-domain scheduling units of each subset; and determining a current inner loop adjustment factor of each time-domain scheduling unit according to the inner loop adjustment factor corresponding to each subset and the history inner loop adjustment factor of each time-domain scheduling unit.

In an exemplary embodiment, determining an inner loop adjustment factor corresponding to each subset according to the block error rates corresponding to the time-domain scheduling units of each subset comprises: determining an inner loop adjustment factor $factor_k$ corresponding to each subset according to the following formula: $factor_k=(BLER\_tar-BLERA_k)*step$, wherein $1 \leq k \leq M$, BLER_tar is a preset target value of the block error rate, $BLERA_k$ is an average value of the block error rates corresponding to the time-domain scheduling units in a subset k, and step is an adjustment step length, and step is greater than 0.

In an exemplary embodiment, determining a current inner loop adjustment factor of each time-domain scheduling unit according to the inner loop adjustment factor corresponding to each subset and the history inner loop adjustment factor of each time-domain scheduling unit comprises: determining a current inner loop adjustment factor $T\_factor_i$, of a time-domain scheduling unit i according to the following formula: $T\_factor_i=(1-\alpha)*T'\_factor_i+\alpha*factor_k$, wherein the time-domain scheduling unit i belongs to a kth subset among the M subsets, $1 \leq i \leq N$, $\alpha$ is a filter factor, $0 \leq \alpha \leq 1$, and $T'\_factor_i$ is a history inner loop adjustment factor of the time-domain scheduling unit i.

In an exemplary embodiment, according to the block error rate corresponding to each time-domain scheduling unit, dividing the N time-domain scheduling units into M subsets comprises: constructing a N×N difference absolute value matrix A according to a block error rate set corresponding to the N time-domain scheduling units, wherein each block error rate in the block error rate set corresponds to each of the N time-domain scheduling units on a one-to-one basis; repeatedly executing the following steps until a value c is equal to 1, wherein a current matrix is initialized to be the matrix A, a current time-domain scheduling unit set is initialized to be a set composed of the N time-domain scheduling units, and the value c is initialized to be the N: searching for a c×c target sub-matrix from the current matrix, wherein each element in the target sub-matrix is less than the preset threshold; in the case where the target sub-matrix is found from the current matrix, determining a set composed of the time-domain scheduling units corresponding to each row in the target sub-matrix as a subset; deleting the subset from the current time-domain scheduling unit set, and determining the current time-domain scheduling unit set from which the subset is deleted as the current time-domain scheduling unit set; determining a (N−c)×(N−c) difference absolute value matrix constructed according to the block error rate set corresponding to the current time-domain scheduling unit set as the current matrix, wherein each block error rate in the block error rate set corresponding to the current time-domain scheduling unit set corresponds to each time-domain scheduling unit in the current time-domain scheduling unit set on a one-to-one basis; and in the case where the target sub-matrix is not found from the current matrix, determining the difference obtained by subtracting 1 from the value c as the value c; wherein in the case where the value c is equal to 1, the time-domain scheduling units corresponding to each row in the current matrix are determined as a subset.

Figure 3:
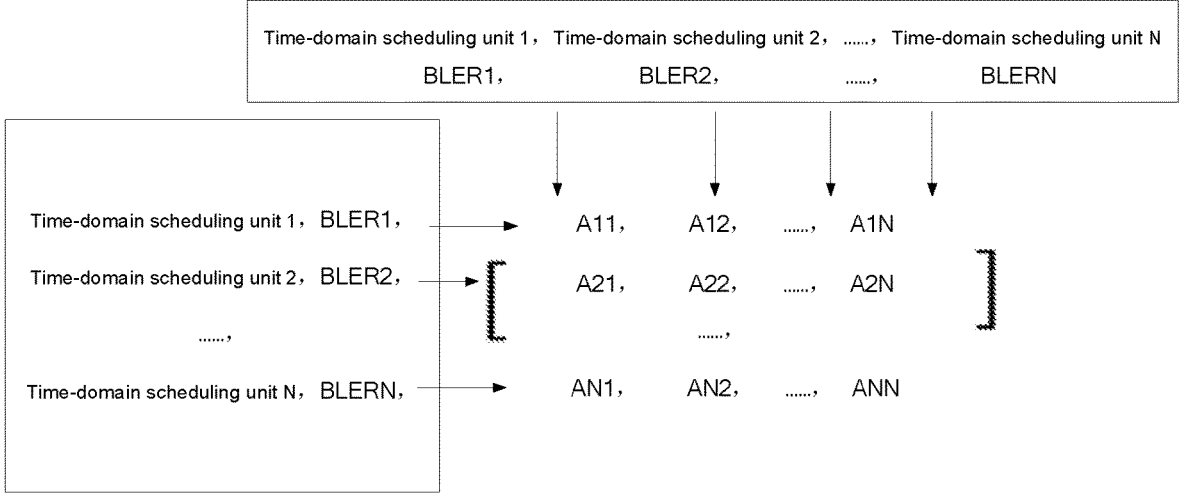
FIG. 3 is a schematic diagram of constructing a difference absolute value matrix by using a method for adjusting an inner loop value according to an embodiment of the present disclosure.

Optionally, as shown in FIG. 3, according to a block error rate set corresponding to the N time-domain scheduling units, a N×N difference absolute value matrix A $$\begin{bmatrix} A_{11} & A_{11} & \dots & A_{1N} \\ A_{21} & A_{22} & \dots & A_{2N} \\ \dots & \dots & \dots & \dots \\ A_{N1} & A_{N2} & \dots & A_{NN} \end{bmatrix}$$

is constructed: wherein each row and each column correspond to a time-domain scheduling unit on a one-to-one basis, and elements in the matrix A satisfy $A_{ij}=|BLER_i-BLER_j|$, j=1, 2, . . . N.

In an exemplary embodiment, according to the block error rate corresponding to each time-domain scheduling unit, dividing the N time-domain scheduling units into M subsets comprises: dividing N block error rates corresponding to the N time-domain scheduling units into M continuous intervals, wherein each of the M intervals comprises at least one block error rate, and the range of the block error rates in each interval is less than the preset threshold; and dividing the time-domain scheduling units, among the N time-domain scheduling units, corresponding to the block error rates included in an interval k among the M intervals into a subset k, so as to obtain totally M subsets by division, wherein 1≤k≤M.

In the described embodiment, when a certain block error rate is a boundary value between two intervals, the time-domain scheduling unit corresponding to the block error rate is divided into the interval that has a smaller starting block error rate value among the two intervals.

In an exemplary embodiment, determining a current inner loop adjustment factor of each time-domain scheduling unit according to the block error rate corresponding to each time-domain scheduling unit and the history inner loop adjustment factor of each time-domain scheduling unit comprises: in the case where the range of the block error rates corresponding to the N time-domain scheduling units is less than a preset threshold, determining that a current inner loop adjustment factor of each time-domain scheduling unit is the history inner loop adjustment factor of each time-domain scheduling unit.

It should be noted that, in the described embodiment, in the case where the range of the block error rates corresponding to the N time-domain scheduling units is less than a preset threshold, the history inner loop adjustment factor of each time-domain scheduling unit continues to be multiplexed, that is, after the current inner loop adjustment factor of each time-domain scheduling unit is determined, the history inner loop adjustment factor of each time-domain scheduling unit remains unchanged.

In an exemplary embodiment, after determining a current inner loop adjustment factor of each time-domain scheduling unit according to the block error rate corresponding to each time-domain scheduling unit and the history inner loop adjustment factor of each time-domain scheduling unit, the method further comprises: in the case where the range of the block error rates corresponding to the N time-domain scheduling units is greater than or equal to a preset threshold, updating the history inner loop adjustment factor of each time-domain scheduling unit to be a current inner loop adjustment factor of each time-domain scheduling unit respectively.

In an exemplary embodiment, adjusting an inner loop value corresponding to each time-domain scheduling unit according to the current inner loop adjustment factor of each time-domain scheduling unit comprises: determining a sum of an inner loop value $d_i$ corresponding to a user in a time-domain scheduling unit i and a current inner loop adjustment factor T_factor$_i$ of the time-domain scheduling unit i; and determining the sum of the inner loop value $d_i$ and the current inner loop adjustment factor T_factor$_i$ as the adjusted inner loop value of the user in the time-domain scheduling unit i.

In an exemplary embodiment, in the case where the radio frame is a radio frame in a 4G communication system, each time-domain scheduling unit in the radio frame corresponds to each subframe in the radio frame on a one-to-one basis, wherein N is the number of subframes in the radio frame; and in the case where the radio frame is a radio frame in a 5G communication system, each time-domain scheduling unit in the radio frame corresponds to each time slot in the radio frame on a one-to-one basis, wherein N is the number of time slots in the radio frame.

It should be noted that, in the described embodiment, the inner loop value is a channel measurement value of a base station for a user. Therefore, in the described embodiment, the adjusted inner loop value of the time-domain scheduling unit may be set to determine a scheduling policy corresponding to the time-domain scheduling unit, i.e. in the described embodiment, the scheduling policy corresponding to each time-domain scheduling unit can be determined according to the adjusted inner loop value of each time-domain scheduling unit, so that differential scheduling can be performed for each time-domain scheduling unit according to a difference in demodulation performance of users in each time-domain unit.

It should be noted that, in the described embodiment, the range of the block error rates corresponding to the N time-domain scheduling units is a difference between a maximum value among the block error rates corresponding to the N time-domain scheduling units and a minimum value among the block error rates corresponding to the N time-domain scheduling units.

The method for adjusting an inner loop value in the described embodiment is explained below with reference to an example, which is not intended to limit the technical solution of the embodiment of the present disclosure.

Figure 4:
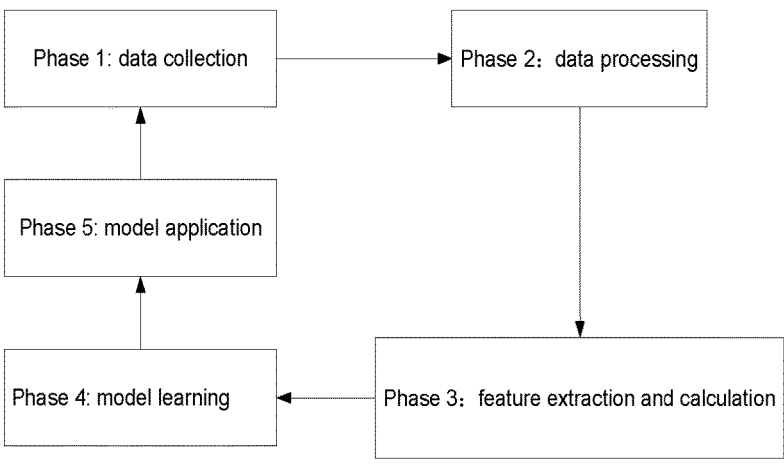
FIG. 4 is a flowchart of a method for adjusting an inner loop value according to another embodiment of the present disclosure.

In an exemplary embodiment, provided is a method for adjusting an inner loop value. As shown in FIG. 4, the method comprises the following phases:

phase 1: data collection, wherein phase 1 comprises the following steps:

step 1: for a 4G system, initializing an inner loop converted value of each subframe in a radio frame; and for a 5G system, initializing an inner loop conversion factor of each time slot in a radio frame;

it should be noted that, in the embodiment of the present disclosure, all subframes or time slots may be referred to as time-domain scheduling units in a radio frame;

step 2: collecting ACK/NACK information except conservative scheduling on each time-domain scheduling unit, and separately counting same for each time-domain scheduling unit; and step 3: determining whether the number of samples collected on each time-domain scheduling unit reaches a minimum threshold, and if not, returning to step 2, and continuing to collect statistics; otherwise, according to the ACK/NACK information collected on each time-domain scheduling unit, calculating a BLER corresponding to each time-domain scheduling unit, so as to obtain a corresponding BLER information set on each time-domain scheduling unit in the radio frame;

phase 2: data processing;

phase 3: feature extraction and calculation; wherein phase 3 comprises the following steps:

step 4: according to the corresponding BLER information set on each time-domain scheduling unit in the radio frame, calculating a statistical quantity reflecting the divergence degree of the BLER information set; and step 5: according to the statistical quantity, determining whether the divergence degree of the corresponding BLER information set on each time-domain scheduling unit in the radio frame is greater than a given threshold; if it is greater than a given threshold, performing differential conversion between time-domain scheduling units and proceeding to step 6; otherwise, multiplexing a conversion factor corresponding to each current time-domain scheduling unit, using the conversion factor to perform inner loop conversion for users in the corresponding time-domain scheduling unit, proceeding to step 2, and clearing historical data collected most recently (i.e. ACK/NACK information collected most recently);

phase 4: model learning, wherein phase 4 comprises the following steps:

step 6: classifying the time-domain scheduling units in the radio frame, so that the divergence degree of the BLER information corresponding to the time-domain scheduling units in each category is less than a given threshold;

step 7: calculating average BLER information corresponding to each category;

step 8: according to target BLER information set by the system and the calculated average BLER information of each category, calculating an inner loop conversion factor of the corresponding category; and step 9: according to a maintained history inner loop conversion factor of the time-domain scheduling unit, the set to which the time-domain scheduling unit belongs, and the conversion factor corresponding to the set, updating the inner loop conversion factor of each time-domain scheduling unit, so as to obtain the inner loop conversion factor of each time-domain scheduling unit in the radio frame;

phase 5: model application, wherein phase 5 comprises the following steps:

step 10: outputting the inner loop conversion factor on each time-domain scheduling unit, and using the factor to perform inner loop conversion for users in the corresponding time-domain scheduling unit; and step 11: proceeding to step 2, clearing the statistical information of the previous round, and performing the next round of learning.

Figure 5:
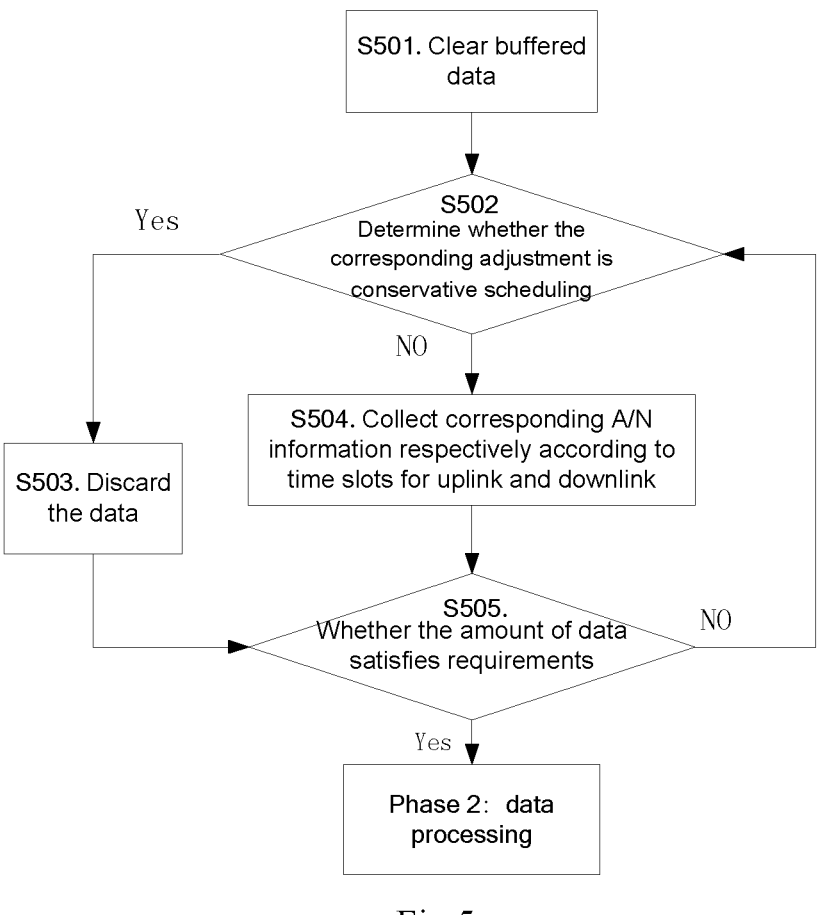
FIG. 5 is a flowchart of a data collection phase of a method for adjusting an inner loop value according to another embodiment of the present disclosure.

In an exemplary embodiment, as shown in FIG. 5, the data collection phase (i.e. the process of counting the number of ACKs/NACKs) specifically comprises the following steps:

step S501: clearing buffered data;

step S502: determining whether the corresponding adjustment is conservative scheduling; if so, executing step S503; otherwise, executing step S504;

step S503: discarding the data, and proceeding to step S505;

step S504: collecting corresponding ACK/NACK information respectively according to time slots for uplink and downlink; and step S505: determining whether the number of collected samples satisfies requirements; if so, proceeding to phase 2 for data processing, otherwise returning to step S502.

Figure 6:
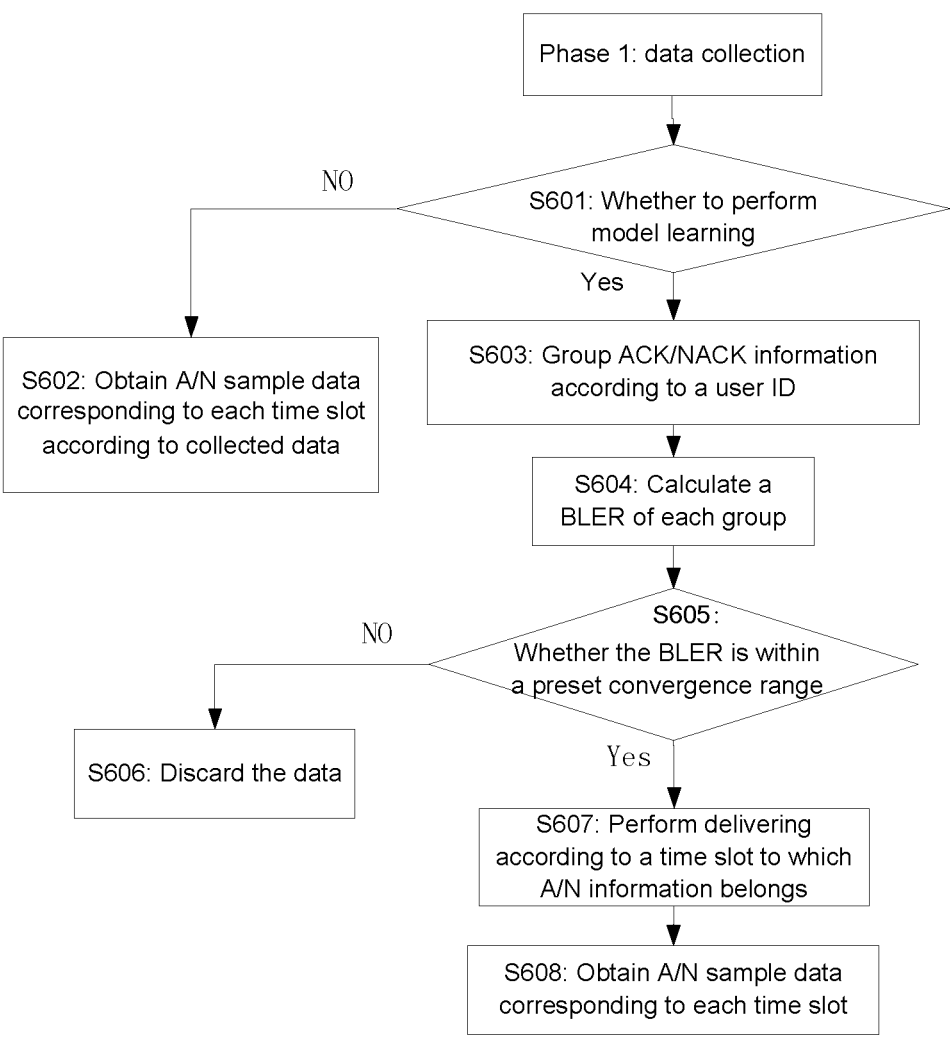
FIG. 6 is a flowchart of a data processing phase of a method for adjusting an inner loop value according to another embodiment of the present disclosure.

In an exemplary embodiment, as shown in FIG. 6, the data processing phase comprises the following steps:

step S601: determining whether to perform model learning (i.e. determining whether to perform inter-subframe differential conversion); if so, executing step S603, otherwise, executing step S602;

step S602: obtaining A/N sample data corresponding to each time slot according to collected data, and ending the current data processing phase;

step S603: aggregating counted ACK/NACK information according to a user ID;

step S604: calculating a BLER corresponding to each user;

step S605: determining whether the BLER corresponding to each user is within a corresponding convergence interval, if so, executing step S607, otherwise, executing step S606; step S606: discarding the data;

step S607: according to a subframe to which ACK/NACK belongs, delivering ACK/NACK data corresponding to each user to a set corresponding to the subframe; and step S608: obtaining ACK/NACK sample data corresponding to each time slot.

In an exemplary embodiment, as shown in FIG. 7, the feature extraction and calculation phase comprises the following steps:

step S701: acquiring A/N sample data corresponding to each time slot;

step S702: calculating a BLER corresponding to each time slot to obtain a set BLER_SET;

step S703: calculating the range of the set BLER_SET step S704: determining whether the range is greater than a given threshold TH; if so, executing to step S706, otherwise, executing step S705;

step S705: continuing to collect data, and using an existing model instead of correcting the existing model; and step S706: learning and correcting the model.

In an exemplary embodiment, as shown in FIG. 8, the model learning phase comprises the following steps:

step S801: acquiring a BLER corresponding to each time slot;

step S802: classifying time slots;

wherein during classification, classification is performed according to the following classification rules:

the range in each category is less than a threshold; the range of the union of any two categories is greater than a threshold; time-domain scheduling units (for example, time slots) in any two categories have no intersection; and the union of all categories is the set composed of all time slots;

step S803: calculating an average BLER of each category;

step S804: calculating a correction value of each category; wherein specifically, an inner loop adjustment factor of each category is calculated according to a target BLER, the average BLER of each category and an adjustment step length; and step S805: correcting a model; wherein specifically, an inner loop adjustment factor of each time slot is calculated.

In an exemplary embodiment, as shown in FIG. 9, the model application phase comprises the following steps:

step S901: acquiring a correction value corresponding to each time slot according to a model correction result;

step S902: determining that a user schedules a corresponding time slot (including but not limited to a corresponding air interface index);

step S903: determining an inner loop correction value corresponding to the time slot; wherein a corresponding inner loop correction value is determined according to an index position, so as to perform inner loop correction; and step S904: determining the scheduling of the user according to the corrected inner loop and outer loop.

In an exemplary embodiment, provided is a method for adjusting an inner loop value. The method can be applied to a Long Term Evolution (LTE) system. By taking a subframe in a radio frame of an LTE system as an example of a time-domain scheduling unit in the described embodiment, the method comprises the following steps:

step 1: initializing an inner loop conversion factor (i.e. the inner loop adjustment factor in the described embodiment) of each subframe of a radio frame as:

$$sf\_factor_i=0, i=1,2, \ldots N$$

where $sf\_factor_i$ represents an inner loop conversion factor corresponding to an i th subframe, and N represents the number of subframes included in a radio frame;

step 2: counting the number of ACKs/NACKs corresponding to each subframe except conservative scheduling; wherein the number of ACK/NACKs is maintained according to the subframes corresponding to the ACKs/NACKs, for example, each piece of collected ACK/NACK information (or referred to as a sample) is maintained according to the following format: user ID information carried in the ACK/NACK: a subframe to which the ACK/NACK belongs;

step 3: determining whether the number of ACK/NACK samples collected for each subframe reaches a threshold of the number of samples, and if not, returning to step 2 to continue to collect statistics; otherwise, performing the following steps:

step 3.1: aggregating the collected ACK/NACK information according to a user ID, and calculating a BLER corresponding to each user;

step 3.2: determining whether the BLER corresponding to each user is within a corresponding convergence interval (the convergence interval is a preset interval range, for example, a range from 0.08 to 0.12); if so, according to a subframe to which ACK/NACK belongs, delivering ACK/NACK data corresponding to each user to a set corresponding to the subframe, and executing step 3.3; if not, discarding the user's data; and step 3.3: calculating a BLER corresponding to each subframe, and collecting statistics of BLER information corresponding to each subframe to obtain a BLER set (BLER_SET):

$$BLER\_SET=\{BLER_i|i=1,2, \ldots N\}$$

where $BLER_i$ represents a block error rate corresponding to an ith subframe;

step 4: calculating the range D of the set BLER_SET:

$$D=\max\{BLER_i|i=1,2, \ldots N\}-\min\{BLER_i|i=1,2, \ldots N\};$$

wherein the max{ } function represents taking the maximum value, and the min{ } function represents taking the minimum value;

step 5: determining whether the range is greater than a given threshold TH (i.e. the preset threshold in the described embodiment); if D≥TH, determining to perform inter-subframe differential conversion, proceeding to step 6; otherwise, multiplexing the current subframe conversion factor $sf\_factor_i$, i=1, 2, . . . N, proceeding to step 2, and clearing historical data collected most recently;

step 6: dividing the set BLER_SET into N subsets $\{set_k|k=1, 2, \ldots N\}$, wherein $set_k$ corresponds to an ith subframe among the N sub-frames, and k=i;

step 7: calculating an average BLER $BLERA_k$ corresponding to each of N subsets respectively, wherein in the present embodiment $$BLERA_k=BLER_k, k=1,2, \ldots N$$

step 8: calculating an inner loop conversion factor $factor_k$ corresponding to each subset:

$$factor_k=(BLER\_tar-BLERA_k)*step,$$

wherein BLER_tar is a preset target value of the block error rate, and step is a preset value;

step 9: calculating an inner loop conversion factor corresponding to each subframe:

$$sf\_factor_i=(1-\alpha)*sf\_factor_i+\alpha*factor_k,$$

wherein $\alpha$ is a filter factor, and $sf\_factor$ is a history inner loop conversion factor;

step 10: outputting the inner loop conversion factor $sf\_factor_i$, i=1, 2, . . . N of each subframe, and using the inner loop conversion factor of each subframe to convert an inner loop value of the corresponding subframe; and step 11: proceeding to step 2, clearing the statistical information of the previous round, and performing the next round of learning.

In an exemplary embodiment, provided is a method for adjusting an inner loop value. The method can be applied to a 5G NR system. By taking a time slot in a radio frame of a 5G NR system as an example of a time-domain scheduling unit in the described embodiment, the method comprises the following steps: in the case where the time-domain scheduling unit is a time slot in a radio frame of a 5G NR system, a block error rate corresponding to each time-domain scheduling unit is actually a slot error rate corresponding to each time slot:

step 1: initializing an inner loop conversion factor of each time slot in a radio frame:

$$slot\_factor_i=0, i=1,2, \ldots N$$

wherein $slot\_factor_i$ represents a conversion factor corresponding to an ith time slot, and N represents the number of time slots in a radio frame;

step 2: counting the number of ACKs/NACKs corresponding to each time slot except conservative scheduling, and maintaining collected ACK/NACK data (or referred to as samples) according to the time slot, wherein counting is performed separately for each time slot;

step 3: determining whether the number of ACK/NACK samples collected for each time slot reaches a minimum threshold (the minimum threshold may be 100000, i.e. it needs to be ensured that the number of ACK/NACK samples collected for each time slot reaches 100000), and if not, returning to step 2 to continue to collect statistics; otherwise, calculating a BLER corresponding to each time slot, and collecting statistics of BLER information corresponding to each time slot to obtain a BLER set (BLER_SET):

$$BLER\_SET=\{BLER_i|i=1,2, \ldots N\}$$

wherein $BLER_i$ represents a slot error rate corresponding to an ith time slot;

step 4: calculating the range D of the set BLER_SET.

$$D=\max\{BLER_i|i=1,2, \ldots N\}-\min\{BLER_i|i= 1,2, \ldots N\}$$

step 5: determining whether the range is greater than a given threshold; if D≥TH, determining to perform inter-time slot differential conversion, proceeding to step 6; otherwise, multiplexing the current time slot conversion factor slot_factor$_i$, i=1, 2, . . . N, proceeding to step 2, and clearing historical data collected most recently;

step 6: dividing the set BLER_SET into M subsets {set$_k$|k=1, 2, . . . M}, wherein the specific division method comprises: initializing a time slot set St to be a set composed of N time slots;

step 6.1: constructing a N×N inter-time slot BLER difference absolute value matrix A according to BLER_SET.

step 6.2: according to the constructed difference absolute value matrix A, starting from N, searching for a sub-matrix in a dimension reduction manner, wherein the sub-matrix satisfies the following conditions: each element is less than a threshold TH, and the condition that each element in the sub-matrix is less than a threshold TH is not satisfied when one more dimension is increased; wherein if there are a plurality of sub-matrices of the same dimension satisfying these conditions, the sub-matrix with the smallest average value of all the elements in the sub-matrix is selected, and the selected sub-matrix is recorded as a matrix B;

step 6.3: determining time slot numbers corresponding to rows of the matrix B, and constituting a subset set;

step 6.4: deleting the time slots included in the subset set from the time slot set St, so as to obtain a time slot set St, constructing a matrix C according to a slot error rate set corresponding to the time slot set St, and assigning the matrix C to A; and step 6.5: repeating the process of steps 6.2 to 6.4, and finally obtaining {set$_k$|k=1, 2, . . . M};

step 7: calculating an average BLER corresponding to each of M subsets respectively:

$$BLERA_k = \frac{\sum_{h=1}^{|set_k|} BLER_h}{|set_k|}, k = 1, 2, \ldots M,$$

wherein |set$_k$| represents the number of elements in the set set$_k$;

step 8: calculating an inner loop conversion factor corresponding to each subset:

$$factor_k=(BLER\_tar-BLERA_k)*step.$$

step 9: calculating an inner loop conversion factor corresponding to each time slot, wherein for a time slot i, if i∈set$_k$ (i.e. the set to which the time slot i belongs is i∈set$_k$) the inner loop conversion factor corresponding to the subframe is updated according to the following formula:

$$slot\_factor_i=(1-\alpha)*slot'\_factor_i+\alpha*factor_k$$

wherein α is a filter factor, and slot'_factor$_i$ is a history inner loop conversion factor;

step 10: outputting the inner loop conversion factor slot-_factor$_i$, i=1, 2, . . . N of each time slot, and using the factor of each subframe to perform inner loop conversion for users in the corresponding time slot; and step 11: proceeding to step 2, clearing the statistical information of the previous round, and performing the next round of learning.

In an exemplary embodiment, provided is a method for adjusting an inner loop value. The method can be applied to a 5G NR system. By taking a time slot in a radio frame of a 5G NR system as an example of a time-domain scheduling unit in the described embodiment, the method comprises the following steps: in the case where the time-domain scheduling unit is a time slot in a radio frame of a 5G NR system, a block error rate corresponding to each time-domain scheduling unit is actually a slot error rate corresponding to each time slot:

step 1: initializing an inner loop conversion factor of each time slot in a radio frame:

$$slot\_factor_i=0, i=1,2, \ldots N$$

where slot_factor$_i$ represents an inner loop conversion factor corresponding to an ith time slot, and N represents the number of time slots in a radio frame;

step 2: counting the number of ACKs/NACKs of each time slot, wherein the ACKs/NACKs in conservative scheduling are not counted, and the NACKs in lowest-order scheduling are not counted and the ACKs in highest-order scheduling are not counted, i.e. the counted ACKs/NACKs of each time slot do not comprise the ACKs/NACKs in conservative scheduling, the NACKs in lowest-order scheduling and the ACKs in highest-order scheduling; and maintaining collected ACK/NACK data according to the time slot, wherein the ACKs/NACKs of each time slot are counted separately;

step 3: determining whether the number of ACK/NACK samples collected for each time slot reaches a minimum threshold (the minimum threshold may be 100000, i.e. it needs to be ensured that the number of ACK/NACK samples collected for each time slot reaches 100000), and if not, returning to step 2 to continue to collect statistics; otherwise, calculating a BLER corresponding to each time slot, and collecting statistics for each time slot to obtain a BLER set (BLER_SET):

$$BLER\_SET=\{BLER_i|i=1,2, \ldots N\}$$

wherein BLER$_i$ represents a slot error rate corresponding to an ith time slot;

step 4: calculating the range D of the set BLER_SET:

$$D=\max\{BLER_i|i=1,2, \ldots N\}-\min\{BLER_i |i=1,2, \ldots N\}.$$

step 5: determining whether the range is greater than a given threshold; if D≥TH determining to perform inter-time slot differential conversion, proceeding to step 6; otherwise, multiplexing the current time slot conversion factor slot_factor$_i$, i=1, 2, . . . N, proceeding to step 2, and clearing historical data collected most recently;

step 6: dividing the set BLER_SET into M subsets {set$_k$|k=1, 2, . . . M}, wherein the specific division method comprises:

step 6.1: sorting time slot indexes (for example, time slot serial numbers) in an ascending order of BLERs corresponding to all the time slots;

step 6.2: taking the minimum BLER among the BLERs corresponding to all the time slots as a starting point and the maximum BLER+0.1 as an ending point, and taking a preset block error rate interval as a step length to divide all the sorted BLERs into several intervals (the length of the last interval possibly is less than a fixed preset block error rate interval); and step 6.3: from the divided several intervals obtained according to step 6.2, selecting several left-closed right-open intervals, and classifying corresponding time slots according to the intervals to which the BLERs corresponding thereto belong, so as to obtain a subset division {$set_k$|k=1, 2, . . . M};

step 7: calculating an average BLER corresponding to each of M subsets respectively:

$$BLERA_k = \frac{\sum_{h=1}^{|set_k|} BLER_h}{|set_k|}, k = 1, 2, \ldots M,$$

wherein |$set_k$| represents the number of elements in the set $set_k$;

step 8: calculating an inner loop conversion factor corresponding to each subset:

$$factor_k = (BLER\_tar - BLERA_k)^*step.$$

step 9: calculating an inner loop conversion factor corresponding to each time slot, wherein for a time slot i, if i∈$set_k$ (i.e. the set to which the time slot i belongs is i∈$set_k$) the inner loop conversion factor corresponding to the subframe is updated according to the following formula:

$$slot\_factor_i = (1-\alpha)^*slot'\_factor_i + \alpha^*factor_k$$

where $\alpha$ is a filter factor, and $slot'\_factor_i$ is a history inner loop conversion factor;

step 10: outputting the inner loop conversion factor $slot\_factor_i$, i=1, 2, . . . N of each time slot, and using the factor of each subframe to perform inner loop conversion for users in the corresponding time slot; and step 11: proceeding to step 2, clearing the statistical information of the previous round, and performing the next round of learning.

It should be noted that, in the described embodiment, the method for adjusting an inner loop value in the described embodiment may be repeatedly executed for multiple times. In the case where the range of the block error rates corresponding to all time-domain scheduling units in a radio frame is less than a preset threshold, a current inner loop adjustment factor of each time-domain scheduling unit is determined as a history inner loop adjustment factor of each time-domain scheduling unit (optionally, the history inner loop adjustment factor of each time-domain scheduling unit remains unchanged, or the history inner loop adjustment factor of each time-domain scheduling unit is updated to be a current inner loop adjustment factor of each time-domain scheduling unit), previously collected ACK/NACK information is cleared, and the steps of collecting ACK/NACK information corresponding to each time-domain scheduling unit and determining a block error rate corresponding to each time-domain scheduling unit are re-executed; and in the case where the range of the block error rates corresponding to all time-domain scheduling units in a radio frame is greater than or equal to a preset threshold, after determining a current inner loop adjustment factor of each time-domain scheduling unit according to the block error rate corresponding to each time-domain scheduling unit and the history inner loop adjustment factor of each time-domain scheduling unit, the history inner loop adjustment factor of each time-domain scheduling unit is updated to be the current inner loop adjustment factor of each time-domain scheduling unit.

By means of the described embodiment, historical data (i.e. the ACK/NACK data corresponding to each time-domain scheduling unit) in a network is adopted, wherein the historical data may be convergence data of a user historically (only data of conservative scheduling is not contained), and may also be all data historically (regardless of convergence or non-convergence, but data of conservative scheduling is excluded); BLERs in all time slots are counted; the range of the BLERs for all the time slots is calculated; thus, it is determined whether the difference in BLER between the time slots is greater than a certain threshold, and if it is less than a certain threshold, a currently existing conversion model (i.e. the inner loop conversion factor corresponding to each time-domain scheduling unit) is used; otherwise, the conversion amount of each time slot is learnt according to historical data, and the conversion model is corrected; wherein when a conversion model is corrected, specifically, according to a BLER distribution situation of the time slots, all the time slots are grouped (i.e. the subsets) according to a certain rule, for example, the range in each group is less than a threshold, and the range after any two groups are combined is greater than a threshold, time-domain scheduling units (for example, time slots) in any two groups have no intersection, and the union of all the groups is the set composed of all the time slots; then, an average BLER of each subset is counted; according to the counted BLER, a set target BLER and a corresponding adjustment step length, an inner loop conversion factor corresponding to each time slot is calculated; and the inner loop conversion factor and the history inner loop conversion factor of each time-domain scheduling unit are filtered to obtain a new inner loop correction model (i.e. the inner loop conversion factor) for each time-domain scheduling unit, the model is applied, and it is continued to collect historical data so as to continuously correct the model, finally realizing, as far as possible, the adaptation of the scheduling of users to channels of time slots where the users are located.

On the basis of described embodiment, the technical problem that the demodulation performance of a network side for the same user in different uplink time slots differs or the demodulation performance of the same user for different downlink time slots differs caused by factors such as the difference of reference signals contained in different time slots or uplink-downlink switching. Furthermore, the present disclosure can solve the technical problem in traditional AMC technologies of impaired spectral efficiency because that the difference in demodulation performance of users in different time slots cannot be quickly embodied due to the user level. Moreover, the present disclosure can solve the problem in inter-time slot AMC technologies that it is difficult for users in small packet scheduling to converge and it is difficult for new AMC to converge due to further discrete sample data learnt by AMC.

The described embodiment relates to learning and correction of a difference in demodulation performance when there is a difference in transmission/reception between time slots; wherein a difference in demodulation performance of users in different time slots is learnt on the basis of historical data, and relevant conversion processing is performed on inner loop values of different time slots according to a learning result, so that differential scheduling is realized according to the difference in demodulation performance of users in different time slots, thereby improving the spectral efficiency.

From the description of the described embodiment, a person skilled in the art may clearly understand that the method according to the described embodiment may be implemented by software and a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and comprises several instructions for causing a terminal device (which may be a mobile phone, a computer, a server, or a network device) to execute the method described in the embodiment of the present disclosure.

Further provided in the present embodiment is an apparatus for adjusting an inner loop value, which is configured to implement the described embodiment and preferred implementation, and what has been described will not be described herein again. The term "module", as used hereinafter, is a combination of software and/or hardware capable of realizing a predetermined function. Although the apparatus described in the following embodiment is preferably implemented by software, implementation by hardware or a combination of software and hardware is also possible and conceived.

FIG. 10 is a structural block diagram of an apparatus for adjusting an inner loop value according to an embodiment of the present disclosure. As shown in FIG. 10, the apparatus comprises: a processing module 1002, wherein the processing module is configured to repeatedly execute the following steps, wherein a history inner loop adjustment factor of each time-domain scheduling unit in a radio frame is initialized to be an initial inner loop adjustment factor of each time-domain scheduling unit:

> determining a block error rate corresponding to each time-domain scheduling unit according to ACK/NACK information corresponding to each time-domain scheduling unit, wherein the radio frame comprises N time-domain scheduling units, N being a positive integer;
> determining a current inner loop adjustment factor of each time-domain scheduling unit according to the block error rate corresponding to each time-domain scheduling unit and the history inner loop adjustment factor of each time-domain scheduling unit; and
> adjusting an inner loop value corresponding to each time-domain scheduling unit according to the current inner loop adjustment factor of each time-domain scheduling unit.

According to the present disclosure, the following steps are repeatedly executed, wherein a history inner loop adjustment factor of each time-domain scheduling unit in a radio frame is initialized to be an initial inner loop adjustment factor of each time-domain scheduling unit: determining a block error rate corresponding to each time-domain scheduling unit according to ACK/NACK information corresponding to each time-domain scheduling unit, wherein the radio frame comprises N time-domain scheduling units, N being a positive integer; determining a current inner loop adjustment factor of each time-domain scheduling unit according to the block error rate corresponding to each time-domain scheduling unit and the history inner loop adjustment factor of each time-domain scheduling unit; and adjusting an inner loop value corresponding to each time-domain scheduling unit according to the current inner loop adjustment factor of each time-domain scheduling unit. As a current inner loop adjustment factor of each time-domain scheduling unit is determined according to the block error rate corresponding to each time-domain scheduling unit and the history inner loop adjustment factor of each time-domain scheduling unit, and an inner loop value corresponding to each time-domain scheduling unit is further adjusted according to the current inner loop adjustment factor of each time-domain scheduling unit, the technical problem that a demodulation difference between time-domain scheduling units cannot be quickly compensated by user-level AMC can be solved, and the technical effects of quickly compensating for a demodulation difference between time slots and performing differential scheduling for users in different time-domain scheduling units according to a difference in demodulation performance are achieved.

In an exemplary embodiment, the processing module is further configured to: in the case where the range of the block error rates corresponding to the N time-domain scheduling units is greater than or equal to a preset threshold, determine a current inner loop adjustment factor $T\_factor_i$ of a time-domain scheduling unit i according to the following formula: $T\_factor_i=(1-\alpha)*T'\_factor_i+\alpha*factor_i$, wherein $1\leq i\leq N$, $\alpha$ is a filter factor, $0\leq\alpha\leq1$, $T'\_factor_i$ is a history inner loop adjustment factor of the time-domain scheduling unit i, $factor_i=(BLER\_tar-BLER_i)*step$, BLER_tar is a preset target value of the block error rate, $BLER_i$ is a block error rate corresponding to the time-domain scheduling unit i, and step is an adjustment step length, and step is greater than 0.

In an exemplary embodiment, the processing module is further configured to: in the case where the range of the block error rates corresponding to the N time-domain scheduling units is greater than or equal to a preset threshold, according to the block error rate corresponding to each time-domain scheduling unit, divide the N time-domain scheduling units into M subsets, wherein the range of the block error rates corresponding to the time-domain scheduling units of each of the M subsets is less than the preset threshold, M being a positive integer, and M being less than N; determine an inner loop adjustment factor corresponding to each subset according to the block error rates corresponding to the time-domain scheduling units of each subset; and determine a current inner loop adjustment factor of each time-domain scheduling unit according to the inner loop adjustment factor corresponding to each subset and the history inner loop adjustment factor of each time-domain scheduling unit.

In an exemplary embodiment, determining an inner loop adjustment factor corresponding to each subset according to the block error rates corresponding to the time-domain scheduling units of each subset comprises: determining an inner loop adjustment factor $factor_k$ corresponding to each subset according to the following formula: $factor_k=(BLER\_tar-BLERA_k)*step$, wherein $1\leq k\leq M$, BLER_tar is a preset target value of the block error rate, $BLERA_k$ is an average value of the block error rates corresponding to the time-domain scheduling units in a subset k, and step is an adjustment step length, and step is greater than 0.

In an exemplary embodiment, the processing module is further configured to: determine a current inner loop adjustment factor $T\_factor_i$ of a time-domain scheduling unit i according to the following formula: $T\_factor_i=(1-\alpha)*T'\_factor_i+\alpha*factor_k$, wherein the time-domain scheduling unit i belongs to a kth subset among the M subsets, $1\leq i\leq N$, $\alpha$ is a filter factor, $0\leq\alpha\leq1$, and $T'\_factor_i$ is a history inner loop adjustment factor of the time-domain scheduling unit i.

In an exemplary embodiment, the processing module is further configured to: construct a N×N difference absolute value matrix A according to a block error rate set corresponding to the N time-domain scheduling units, wherein each block error rate in the block error rate set corresponds to each of the N time-domain scheduling units on a one-to-one basis; repeatedly execute the following steps until a value c is equal to 1, wherein a current matrix is initialized to be the matrix A, a current time-domain scheduling unit set is initialized to be a set composed of the N time-domain scheduling units, and the value c is initialized to be the N: searching for a c×c target sub-matrix from the current matrix, wherein each element in the target sub-matrix is less than the preset threshold; in the case where the target sub-matrix is found from the current matrix, determining a set composed of the time-domain scheduling units corresponding to each row in the target sub-matrix as a subset; deleting the subset from the current time-domain scheduling unit set, and determining the current time-domain scheduling unit set from which the subset is deleted as the current time-domain scheduling unit set; determining a (N−c)×(N−c) difference absolute value matrix constructed according to the block error rate set corresponding to the current time-domain scheduling unit set as the current matrix, wherein each block error rate in the block error rate set corresponding to the current time-domain scheduling unit set corresponds to each time-domain scheduling unit in the current time-domain scheduling unit set on a one-to-one basis; and in the case where the target sub-matrix is not found from the current matrix, determining the difference obtained by subtracting 1 from the value c as the value c; wherein in the case where the value c is equal to 1, the time-domain scheduling units corresponding to each row in the current matrix are determined as a subset.

In an exemplary embodiment, the processing module is further configured to: divide N block error rates corresponding to the N time-domain scheduling units into M continuous intervals, wherein each of the M intervals comprises at least one block error rate, and the range of the block error rates in each interval is less than the preset threshold; and divide the time-domain scheduling units, among the N time-domain scheduling units, corresponding to the block error rates included in an interval k among the M intervals into a subset k, so as to obtain totally M subsets by division, wherein $1 \leq k \leq M$.

In an exemplary embodiment, the processing module is further configured to: in the case where the range of the block error rates corresponding to the N time-domain scheduling units is less than a preset threshold, determine that a current inner loop adjustment factor of each time-domain scheduling unit is the history inner loop adjustment factor of each time-domain scheduling unit.

In an exemplary embodiment, the processing module is further configured to: after determining a current inner loop adjustment factor of each time-domain scheduling unit according to the block error rate corresponding to each time-domain scheduling unit and the history inner loop adjustment factor of each time-domain scheduling unit, in the case where the range of the block error rates corresponding to the N time-domain scheduling units is greater than or equal to a preset threshold, update the history inner loop adjustment factor of each time-domain scheduling unit to be a current inner loop adjustment factor of each time-domain scheduling unit respectively.

In an exemplary embodiment, the processing module is further configured to: determine a sum of an inner loop value $d_i$ corresponding to a user in a time-domain scheduling unit i and a current inner loop adjustment factor $T\_factor_i$ of the time-domain scheduling unit i; and determine the sum of the inner loop value $d_i$ and the current inner loop adjustment factor $T\_factor_i$ as the adjusted inner loop value of the user in the time-domain scheduling unit i.

In an exemplary embodiment, in the case where the radio frame is a radio frame in a 4G communication system, each time-domain scheduling unit in the radio frame corresponds to each subframe in the radio frame on a one-to-one basis, wherein N is the number of subframes in the radio frame; and in the case where the radio frame is a radio frame in a 5G communication system, each time-domain scheduling unit in the radio frame corresponds to each time slot in the radio frame on a one-to-one basis, wherein N is the number of time slots in the radio frame.

It should be noted that the described various modules may be implemented by software or hardware. The latter may be implemented in the following manner, but is not limited thereto: all the modules are located in a same processor; alternatively, the described various modules are located in different processors in an arbitrary combination.

The embodiments of the present disclosure further provide a computer-readable storage medium, the computer-readable storage medium storing a computer program, wherein the computer program is configured to execute the steps in any one of the described method embodiments when running.

In an exemplary embodiment, the computer-readable storage medium may comprise, but is not limited to, any medium that can store a computer program, such as a USB flash disk, a Read-Only Memory (ROM), a Random Access Memory (RAM), a mobile hard disk, a magnetic disk, or an optical disk.

The embodiments of the present disclosure further provide an electronic device, comprising a memory and a processor, wherein the memory stores a computer program, and the processor is configured to run the computer program so as to execute the steps in any of the described method embodiments.

In an exemplary embodiment, the electronic device may further comprise a transmission device and an input/output device, wherein the transmission device is connected to the processor, and the input/output device is connected to the processor.

For specific examples in the present embodiment, reference may be made to the examples described in the foregoing embodiments and exemplary implementations, and details are not repeatedly described in the present embodiment.

Obviously, those skilled in the art should understand that various modules or various steps of the present disclosure can be implemented by a universal computing apparatus, and the various modules or steps can be integrated on a single computing apparatus or distributed over a network formed by a plurality of computing apparatuses, and can be implemented by program codes executable by the computing apparatus, so that the modules or steps can be stored in a storage apparatus and executed by the computing apparatus, and the shown or described steps can be executed in sequences different from those described here in some cases, or the various modules or steps can be implemented by manufacturing the modules or steps into various integrated circuit modules respectively, or manufacturing multiple modules or steps among the various modules or steps into a single integrated circuit module. Thus, the present disclosure is not limited to any particular combination of hardware and software.

The foregoing descriptions are merely preferred embodiments of the present disclosure, and are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A method for adjusting an inner loop value, performed by a wireless communication system, comprising: repeatedly executing the following steps, wherein a history inner loop adjustment factor of each time-domain scheduling unit in a radio frame is initialized to be an initial inner loop adjustment factor of each time-domain scheduling unit:

collecting ACK/NACK information corresponding to each time-domain scheduling unit, and determining a block error rate corresponding to each time-domain scheduling unit according to the ACK/NACK information corresponding to each time-domain scheduling unit, wherein the radio frame comprises N time-domain scheduling units, N being a positive integer;

determining a current inner loop adjustment factor of each time-domain scheduling unit according to the block error rate corresponding to each time-domain scheduling unit and the history inner loop adjustment factor of each time-domain scheduling unit;

adjusting an inner loop value corresponding to each time-domain scheduling unit according to the current inner loop adjustment factor of each time-domain scheduling unit; and scheduling each time-domain scheduling unit in the radio frame according to the adjusted inner loop value of each time-domain scheduling unit.

2. The method according to claim 1, wherein determining a current inner loop adjustment factor of each time-domain scheduling unit according to the block error rate corresponding to each time-domain scheduling unit and the history inner loop adjustment factor of each time-domain scheduling unit comprises:

responsive to determining that the range of the block error rates corresponding to the N time-domain scheduling units is greater than or equal to a preset threshold, determining a current inner loop adjustment factor of a time-domain scheduling unit i according to the following formula $T\_factor_i$:

$$T\_factor_i = (1-\alpha)*T'\_factor_i + \alpha*factor_i,$$

wherein $1 \le i \le N$, $\alpha$ is a filter factor, $0 \le \alpha \le 1$, $T'\_factor_i$ is a history inner loop adjustment factor of the time-domain scheduling unit i, $factor_i = (BLER\_tar - BLER_i)*step$, BLER_tar is a preset target value of the block error rate, $BLER_i$ is a block error rate corresponding to the time-domain scheduling unit i, and step is an adjustment step length, and step is greater than 0.

3. The method according to claim 1, wherein determining a current inner loop adjustment factor of each time-domain scheduling unit according to the block error rate corresponding to each time-domain scheduling unit and the history inner loop adjustment factor of each time-domain scheduling unit comprises:

responsive to determining that the range of the block error rates corresponding to the N time-domain scheduling units is greater than or equal to a preset threshold, according to the block error rate corresponding to each time-domain scheduling unit, dividing the N time-domain scheduling units into M subsets, wherein the range of the block error rates corresponding to the time-domain scheduling units of each of the M subsets is less than the preset threshold, M being a positive integer, and M being less than N;

determining an inner loop adjustment factor corresponding to each subset according to the block error rates corresponding to the time-domain scheduling units of each subset; and determining a current inner loop adjustment factor of each time-domain scheduling unit according to the inner loop adjustment factor corresponding to each subset and the history inner loop adjustment factor of each time-domain scheduling unit.

4. The method according to claim 3, wherein determining an inner loop adjustment factor corresponding to each subset according to the block error rates corresponding to the time-domain scheduling units of each subset comprises:

determining an inner loop adjustment factor factory corresponding to each subset according to the following formula:

$$factor_k = (BLER\_tar - BLERA_k)*step,$$

where $1 \le k \le M$, BLER_tar is a preset target value of the block error rate, $BLERA_k$ is an average value of the block error rates corresponding to the time-domain scheduling units in a subset k, and step is an adjustment step length, and step is greater than 0.

5. The method according to claim 4, wherein determining a current inner loop adjustment factor of each time-domain scheduling unit according to the inner loop adjustment factor corresponding to each subset and the history inner loop adjustment factor of each time-domain scheduling unit comprises:

determining a current inner loop adjustment factor $T\_factor_i$ of the time-domain scheduling unit i according to the following formula:

$$T\_factor_i = (1-\alpha)*T'\_factor_i + \alpha*factor_k,$$

wherein the time-domain scheduling unit i belongs to a kth subset among the M subsets, $1 \le i \le N$, $\alpha$ is a filter factor, $2 \le \alpha \le 1$, $T'\_factor_i$ is a history inner loop adjustment factor of the time-domain scheduling unit i.

6. The method according to claim 3, wherein according to the block error rate corresponding to each time-domain scheduling unit, dividing the N time-domain scheduling units into M subsets comprises:

constructing a N×N difference absolute value matrix A according to a block error rate set corresponding to the N time-domain scheduling units, wherein each block error rate in the block error rate set corresponds to each of the N time-domain scheduling units on a one-to-one basis;

repeatedly executing the following steps until a value c is equal to 1, wherein a current matrix is initialized to be the matrix A, a current time-domain scheduling unit set is initialized to be a set composed of the N time-domain scheduling units, and the value c is initialized to be the N:

searching for a c×c target sub-matrix from the current matrix, wherein each element in the target sub-matrix is less than the preset threshold;

responsive to determining that the target sub-matrix is found from the current matrix, determining a set composed of the time-domain scheduling units corresponding to each row in the target sub-matrix as a subset;

deleting the subset from the current time-domain scheduling unit set, and determining the current time-domain scheduling unit set from which the subset is deleted as the current time-domain scheduling unit set;

23 determining a (N–c)×(N–c) difference absolute value matrix constructed according to the block error rate set corresponding to the current time-domain scheduling unit set as the current matrix, wherein each block error rate in the block error rate set corresponding to the current time-domain scheduling unit set corresponds to each time-domain scheduling unit in the current time-domain scheduling unit set on a one-to-one basis; and responsive to determining that the target sub-matrix is not found from the current matrix, determining the difference obtained by subtracting 1 from the value c as the value c;

wherein responsive to determining that the value c is equal to 1, the time-domain scheduling units corresponding to each row in the current matrix are determined as a subset.

7. The method according to claim 3, wherein according to the block error rate corresponding to each time-domain scheduling unit, dividing the N time-domain scheduling units into M subsets comprises:

dividing N block error rates corresponding to the N time-domain scheduling units into M continuous intervals, wherein each of the M intervals comprises at least one block error rate, and the range of the block error rates in each interval is less than the preset threshold; and dividing the time-domain scheduling units, among the N time-domain scheduling units, corresponding to the block error rates included in an interval k among the M intervals into a subset k, so as to obtain totally M subsets by division, wherein 1≤k≤M.

8. The method according to claim 1, wherein determining a current inner loop adjustment factor of each time-domain scheduling unit according to the block error rate corresponding to each time-domain scheduling unit and the history inner loop adjustment factor of each time-domain scheduling unit comprises:

responsive to determining that the range of the block error rates corresponding to the N time-domain scheduling units is less than a preset threshold, determining that a current inner loop adjustment factor of each time-domain scheduling unit is the history inner loop adjustment factor of each time-domain scheduling unit.

9. The method according to claim 1, wherein after determining a current inner loop adjustment factor of each time-domain scheduling unit according to the block error rate corresponding to each time-domain scheduling unit and the history inner loop adjustment factor of each time-domain scheduling unit, the method further comprises:

responsive to determining that the range of the block error rates corresponding to the N time-domain scheduling units is greater than or equal to a preset threshold, updating the history inner loop adjustment factor of each time-domain scheduling unit to be a current inner loop adjustment factor of each time-domain scheduling unit respectively.

10. The method according to claim 1, wherein adjusting an inner loop value corresponding to each time-domain scheduling unit according to the current inner loop adjustment factor of each time-domain scheduling unit comprises:

determining a sum of an inner loop value $d_i$ corresponding to a user in a time-domain scheduling unit i and a current inner loop adjustment factor $T\_factor_i$ of the time-domain scheduling unit i; and

24 determining the sum of the inner loop value $d_i$ and the current inner loop adjustment factor $T\_factor_i$ as the adjusted inner loop value of the user in the time-domain scheduling unit i.

11. The method according to claim 1, wherein responsive to determining that the radio frame is a radio frame in a 4G communication system, each time-domain scheduling unit in the radio frame corresponds to each subframe in the radio frame on a one-to-one basis, wherein N is the number of subframes in the radio frame; and responsive to determining that the radio frame is a radio frame in a 5G communication system, each time-domain scheduling unit in the radio frame corresponds to each time slot in the radio frame on a one-to-one basis, wherein N is the number of time slots in the radio frame.

12. An apparatus for adjusting an inner loop value, comprising: a processing module, wherein the processing module is configured to repeatedly execute the following steps, wherein a history inner loop adjustment factor of each time-domain scheduling unit in a radio frame is initialized to be an initial inner loop adjustment factor of each time-domain scheduling unit:

collecting ACK/NACK information corresponding to each time-domain scheduling unit, and determining a block error rate corresponding to each time-domain scheduling unit according to ACK/NACK information corresponding to each time-domain scheduling unit, wherein the radio frame comprises N time-domain scheduling units, N being a positive integer;

determining a current inner loop adjustment factor of each time-domain scheduling unit according to the block error rate corresponding to each time-domain scheduling unit and the history inner loop adjustment factor of each time-domain scheduling unit;

adjusting an inner loop value corresponding to each time-domain scheduling unit according to the current inner loop adjustment factor of each time-domain scheduling unit; and scheduling each time-domain scheduling unit in the radio frame according to the adjusted inner loop value of each time-domain scheduling unit.

13. An electronic device, comprising a memory and a processor, wherein the memory stores a computer program, and the processor is configured to run the computer program so as to:

repeatedly execute the following steps, wherein a history inner loop adjustment factor of each time-domain scheduling unit in a radio frame is initialized to be an initial inner loop adjustment factor of each time-domain scheduling unit:

collect ACK/NACK information corresponding to each time-domain scheduling unit, and determine a block error rate corresponding to each time-domain scheduling unit according to ACK/NACK information corresponding to each time-domain scheduling unit, wherein the radio frame comprises N time-domain scheduling units, N being a positive integer;

determine a current inner loop adjustment factor of each time-domain scheduling unit according to the block error rate corresponding to each time-domain scheduling unit and the history inner loop adjustment factor of each time-domain scheduling unit;

adjust an inner loop value corresponding to each time-domain scheduling unit according to the current inner loop adjustment factor of each time-domain scheduling unit; and schedule each time-domain scheduling unit in the radio frame according to the adjusted inner loop value of each time-domain scheduling unit.

14. The electronic device according to claim 13, wherein the processor is further configured to:

responsive to determining that the range of the block error rates corresponding to the N time-domain scheduling units is greater than or equal to a preset threshold, determine a current inner loop adjustment factor of a time-domain scheduling unit i according to the following formula T_factor$_i$:

$$T\_factor_i = (1-\alpha)*T\_factor_i + \alpha*factor_i,$$

wherein $1 \leq i \leq N$, $\alpha$ is a filter factor, $0 \leq \alpha \leq 1$, T'_factor$_i$ is a history inner loop adjustment factor of the time-domain scheduling unit i, factor$_i$=(BLER_tar−BLER$_i$)*step, BLER_tar is a preset target value of the block error rate, BLER$_i$ is a block error rate corresponding to the time-domain scheduling unit i, and step is an adjustment step length, and step is greater than 0.

15. The electronic device according to claim 13, wherein the processor is further configured to:

responsive to determining that the range of the block error rates corresponding to the N time-domain scheduling units is greater than or equal to a preset threshold, according to the block error rate corresponding to each time-domain scheduling unit, divide the N time-domain scheduling units into M subsets, wherein the range of the block error rates corresponding to the time-domain scheduling units of each of the M subsets is less than the preset threshold, M being a positive integer, and M being less than N;

determine an inner loop adjustment factor corresponding to each subset according to the block error rates corresponding to the time-domain scheduling units of each subset; and determine a current inner loop adjustment factor of each time-domain scheduling unit according to the inner loop adjustment factor corresponding to each subset and the history inner loop adjustment factor of each time-domain scheduling unit.

16. The electronic device according to claim 15, wherein the processor is further configured to:

determine an inner loop adjustment factor factor$_k$ corresponding to each subset according to the following formula:

$$factor_k = (BLER\_tar - BLERA_k)*step,$$

where $1 \leq k \leq M$, BLER_tar is a preset target value of the block error rate, BLERA$_k$ is an average value of the block error rates corresponding to the time-domain scheduling units in a subset k, and step is an adjustment step length, and step is greater than 0.

17. The electronic device according to claim 16, wherein the processor is further configured to:

determine a current inner loop adjustment factor T_factor$_i$ of the time-domain scheduling unit i according to the following formula:

$$T\_factor_i = (1-\alpha)*T\_factor_i + \alpha*factor_k,$$

wherein the time-domain scheduling unit i belongs to a kth subset among the M subsets, $1 \leq i \leq N$, $\alpha$ is a filter factor, $0 \leq \alpha \leq 1$, T'_factor$_i$ is a history inner loop adjustment factor of the time-domain scheduling unit i.

18. The electronic device according to claim 15, wherein the processor is further configured to:

construct a N×N difference absolute value matrix A according to a block error rate set corresponding to the N time-domain scheduling units, wherein each block error rate in the block error rate set corresponds to each of the N time-domain scheduling units on a one-to-one basis;

repeatedly execute the following steps until a value c is equal to 1, wherein a current matrix is initialized to be the matrix A, a current time-domain scheduling unit set is initialized to be a set composed of the N time-domain scheduling units, and the value c is initialized to be the N:

search for a c×c target sub-matrix from the current matrix, wherein each element in the target sub-matrix is less than the preset threshold;

responsive to determining that the target sub-matrix is found from the current matrix, determine a set composed of the time-domain scheduling units corresponding to each row in the target sub-matrix as a subset;

delete the subset from the current time-domain scheduling unit set, and determine the current time-domain scheduling unit set from which the subset is deleted as the current time-domain scheduling unit set;

determine a (N−c)×(N−c) difference absolute value matrix constructed according to the block error rate set corresponding to the current time-domain scheduling unit set as the current matrix, wherein each block error rate in the block error rate set corresponding to the current time-domain scheduling unit set corresponds to each time-domain scheduling unit in the current time-domain scheduling unit set on a one-to-one basis; and responsive to determining that the target sub-matrix is not found from the current matrix, determine the difference obtained by subtracting 1 from the value c as the value c;

wherein responsive to determining that where the value c is equal to 1, the time-domain scheduling units corresponding to each row in the current matrix are determined as a subset.

19. The electronic device according to claim 15, wherein the processor is further configured to:

divide N block error rates corresponding to the N time-domain scheduling units into M continuous intervals, wherein each of the M intervals comprises at least one block error rate, and the range of the block error rates in each interval is less than the preset threshold; and divide the time-domain scheduling units, among the N time-domain scheduling units, corresponding to the block error rates included in an interval k among the M intervals into a subset k, so as to obtain totally M subsets by division, wherein $1 \leq k \leq M$.

* * * * *